United States Patent [19]

Sticht

[11] Patent Number: 4,502,585
[45] Date of Patent: Mar. 5, 1985

[54] WORKPIECE CARRIER LOCATING AND CLAMPING MECHANISM FOR ASSEMBLY LINE ARRANGEMENT

[76] Inventor: Walter Sticht, Wankhamerstrasse 8, A-4800 Attnang-Puchheim, Austria

[21] Appl. No.: 91,984

[22] Filed: Nov. 7, 1979

Related U.S. Application Data

[63] Continuation-in-part of Ser. No. 891,294, Mar. 29, 1978, abandoned.

[30] Foreign Application Priority Data

Nov. 13, 1978 [AT] Austria .................................. 8085/78

[51] Int. Cl.³ .............................................. B65G 47/00
[52] U.S. Cl. ...................................... 198/345; 198/472
[58] Field of Search ................ 198/345, 472, 648, 722

[56] References Cited

U.S. PATENT DOCUMENTS

| 3,244,123 | 4/1966  | Pestritto et al. | 198/472 |
| 3,418,084 | 12/1968 | Allington        | 198/472 |
| 3,610,391 | 10/1971 | Beck             | 198/722 |
| 3,887,351 | 6/1975  | Dahlman et al.   | 198/345 |
| 3,931,882 | 1/1976  | Ossbahr          | 198/648 |

FOREIGN PATENT DOCUMENTS 485927   1/1976   U.S.S.R. .............................. 198/345

Primary Examiner—Joseph E. Valenza
Attorney, Agent, or Firm—Kurt Kelman

[57] ABSTRACT

An assembly line defining a linear conveying path for successive workpiece carriers comprises a clamping device for stopping and securely holding a respective carrier in a respective processing area along the path, the clamping device including a rack affixed to the carrier and a detent depressable into engagement with the rack for accurately locating the carrier in the processing area and retaining it therein.

14 Claims, 4 Drawing Figures

WORKPIECE CARRIER LOCATING AND CLAMPING MECHANISM FOR ASSEMBLY LINE ARRANGEMENT

This is a continuation-in-part of my copending U.S. application Ser. No. 891,294, filed Mar. 29, 1978, now abandoned and replaced by U.S. application Ser. No. 143,049, filed Apr. 23, 1980.

The present invention relates to an improvement in clamping means for stopping and securely holding a respective workpiece or workpiece carrier in a processing area of an assembly line.

U.S. Pat. No. 4,014,428, dated Mar. 29, 1977, discloses an assembly line arrangement defining a linear conveying path for successive workpieces or workpiece carriers, which comprises a succession of work stations, each work station having a conveyor section and the conveyor sections of successive work stations being arranged in series to constitute the linear conveying path. The conveyor section of each work station has a succession of areas each of which accommodates a respective workpiece or workpiece carrier and at least one of the successive areas is a processing area for working on the workpiece. Each conveyor section includes guide means for vertically and laterally guiding the successive workpieces or workpiece carriers along the conveying path and drive means for driving each workpiece or workpiece carrier through the conveyor section. The assembly line arrangement is a modular conveyor wherein the successive work stations are replaceable. In my copending patent application, I have disclosed an assembly line arrangement of this type wherein the drive means has discrete driving devices, such as driving rollers, spaced along, and separate from, the guide means for individually driving each workpiece or workpiece carrier independently through the conveyor section.

U.S. Pat. No. 3,888,341, dated June 10, 1975, discloses a pallet locating and clamping apparatus for work transfer machinery, wherein a pallet carrying a workpiece is secured in a predetermined position in a work station by means of locating pins moved into bores in the pallet from below and clamping levers pivoted against the upper surface of the pallet. Thus, the pallet is clamped into position by the opposing movement of two elements against the pallet, the pallet being held therebetween. The impact of the two opposing movements of the clamping elements subjects the pallet to a shock which may dislocate workpieces loosely placed on the pallet or may even throw them off the pallet.

It is the primary object of this invention to provide clamping means for stopping and securely holding a respective workpiece or workpiece carrier in a respective processing area smoothly and without undue impact achieved by a unidirectional clamping motion.

The above and other objects are accomplished according to the invention in an assembly line arrangement of the indicated type by a clamping means which includes a stop-defining means affixed to the workpiece or workpiece carrier and a detent element depressable into engagement with the stop-defining means for accurately locating the workpiece or workpiece carrier in the processing area and retaining it therein.

The above and other objects, advantages and features of the present invention will become more apparent from the following detailed description of certain now preferred embodiments thereof, taken in conjunction with the accompanying schematic drawing wherein FIG. 1 is a diagrammatic top plan view showing an assembly line arrangement FIG. 2 is an enlarged top plan view of the processing area of one work station of the assembly line, showing some of the operating structures including one embodiment of the clamping means of this invention;

Figure 1:
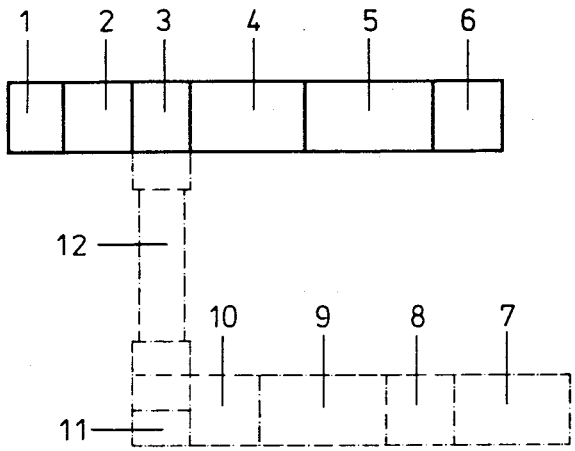

Referring now to the drawing and first to FIG. 1, the illustrated assembly line arrangement defining a linear conveying path for successive workpieces or workpiece carriers, such as pallets, comprises a succession of work stations including feeding station 1, work station 2 provided with a processing area equipped with automatically operating tools, transfer or storage station 3, manual processing station 4, another manual processing station 5 and automatic assembling station 6 equipped with automatically operated means (not shown) for ejecting or removing the assembled workpieces. As will be described more fully in conjunction with FIGS. 2 and 4, each station has a conveyor section and the conveyor sections or successive work stations are arranged in series to constitute a linear conveying path. Each work station is constituted by a replaceable module and the conveyor section of each station may be coupled to the conveyor section of an adjacent station. Each conveyor section includes guide means for vertically and laterally guiding the successive workpieces or workpiece carriers along the conveying path. The drive means for driving each workpiece or workpiece carrier through the conveyor section has discrete driving devices, such as friction rollers, spaced along, and separate from, the guide means for individually driving each workpiece or workpiece carrier independently through the conveyor section. A separate motor is provided at each station for driving the driving rollers and the speed of each motor may be individually controlled. Connections to the motor speed controls of adjacent stations and/or to a central motor speed control may be provided for an additional control of the driving speeds of each motor and for de-energizing the motor drive means when required. In this manner, the residence time of the workpieces or workpiece carriers in each station may be controlled individually in dependence on the required processing time and from a central control. The separate and independent driving means may convey the workpieces or workpiece carriers at different speeds.

The several stations 1 to 6 are interconnected by quick-acting couplings and, particularly if the station modules are relatively small, they can be mounted on a machine bed or other support so that they abut and are aligned with each other. In this manner, any station module may be removed quickly, if required, and the remaining station modules may then be re-arranged to abut each other, or a station module may be removed and replaced by another station module.

Another possible assembly line arrangement has been indicated in broken and dash-dotted lines in FIG. 1. It is assumed that the workpieces being assembled or processed could travel through stations 4, 5 and 6 at a speed much higher than the speed which can be attained in work stations 1 and 2 so that stations 4 to 6 are not fully utilized. It has also been assumed that it is desired to make a second product similar to the product manufactured and/or assembled on assembly line 1 to 6, the second product having virtually the same overall dimension as, but requiring a larger number of processing steps than, the first product and the second product being subjected in stations 4 to 6 to the same assembling and/or processing operations. In this case, work stations 7 to 10 are provided for the preliminary processing of the second product and constitute a separate portion of the assembly line. At the end of this separate assembly line portion, transfer station 11 receives the workpieces or the carriers supporting the workpieces from the separate assembly line portion and deposits them on a transverse conveyor, for instance belt conveyor 12 which delivers them to transfer or storage station 3. A transfer device at that station moves them to work station 4 to 6. In this case, stations 1 and 2 may have a relatively low capacity while stations 4 to 6 are automatically operated, high-capacity work stations. Stations 7 to 10 may be used for the same assembling and processing operations as stations 1 and 2 so that the total output can be increased.

Figure 2:
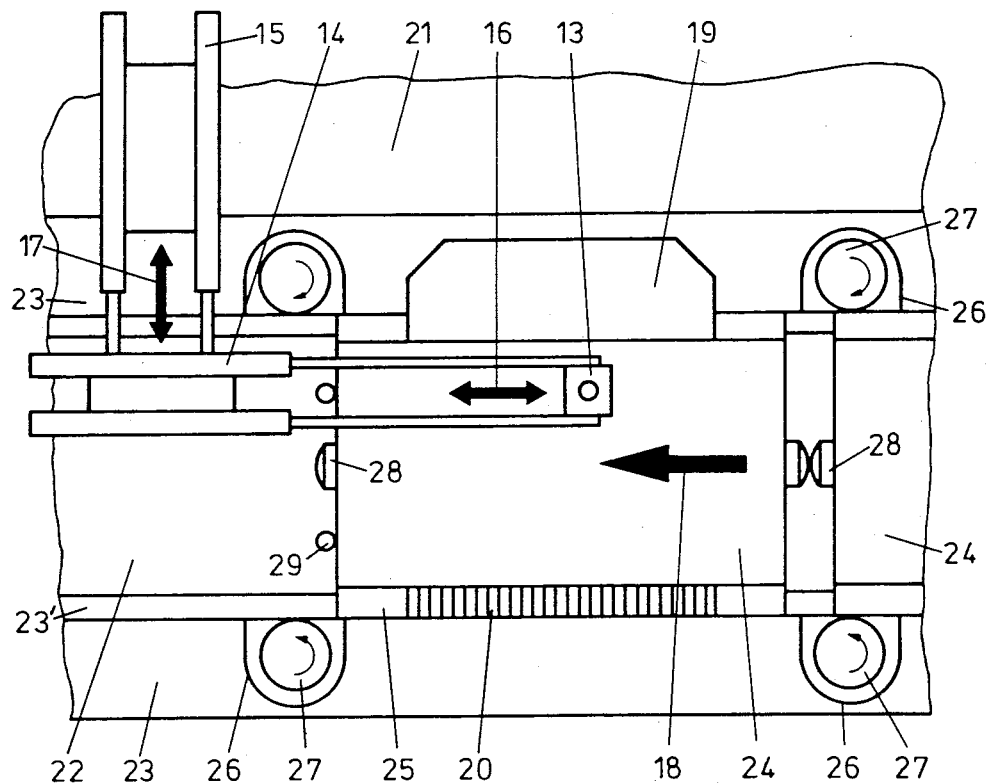

The fragmentary top view of FIG. 2 shows a portion of removable and replaceable work station module 21 forming, for example, work station 2 and comprising a table with a flat support which is a guide means for vertically guiding the successive workpieces or workpiece carriers in the processing area. This table may be placed on a machine bed prepared for the assembly line or directly on the floor. Quick-acting couplings at the respective ends of the table enable it to be readily connected to, and aligned with, adjacent work station modules, suitable leveling means (not shown) being provided, if desired, to assure vertical alignment of the flat table supports.

As shown, the work station has a conveyor section 22 and the conveyor sections or successive work stations are arranged in series to constitute the linear conveying path of the assembly line arrangement. The conveyor section of each work station has a succession of areas of which accommodates a respective workpiece or, as shown, workpiece carrier 24 and at least one of the successive areas is a processing area for working on the workpiece. In the illustrated embodiment, pallets 24 constitute carriers for workpiece (not shown in FIG. 2) and the processing area is constituted by the work station area which accommodates pallet 24 shown in full. Conveyor section 22 includes guide means for vertically and laterally guiding successive workpiece carriers 24 along the conveying path. The illustrated guide means for vertically guiding successive pallets 24 comprises the flat support of the table constituting work station module 21 and the illustrated guide means for laterally guiding pallets 24 comprises guide ledges 23, 23 mounted on the flat support. The guide ledges carry inwardly projecting ledge portions 23' defining lateral guide grooves receiving and guiding guide ribs 25, 25 extending along both sides of pallets 24.

The conveyor section also includes drive means for driving each workpiece carrier 24 through the conveyor section, the illustrated drive means having discrete driving devices, such as illustrated friction rollers 27, spaced along, and separate from, the guide means for individually driving each pallet 24 independently through the conveyor section. As shown, ledges 23 define semi-circular apertures 26 which accommodate friction rollers 27 which are driven by a motor (not shown) at a predetermined and controllable speed to move the pallets in the direction of arrow 18 along the conveying path, the friction rollers being in pressure contact with the side of guide ribs 25 of pallets 24.

As is more fully described in my copending patent application, the transmission to the friction rollers includes friction couplings enabling each workpiece carrier 24 to remain in the processing area for a given length of time. Stop pins 29 are mounted adjacent and downstream of the processing area and these pins are actuated to arrest workpiece carrier 24 in the processing area. Pins 29, which are retractably mounted in the flat support of the table, may also constitute sensors, which, in response to the impact of the workpiece carrier therein, initiate the operation of the clamping means hereinafter described. Also, the respective ends of pallets 24 carry buffers 28 so as to absorb the impact of successive pallets contacting each other along conveyor section 22. It is apparent from FIG. 2 that the total length of the conveyor section is a multiple of the length of a workpiece carrier so that a waiting area for receiving a carrier is disposed outside the processing area. When retractable pins 29 are extended, they limit the further movement of carrier 24 in the direction of arrow 18 and the carrier is then accurately located in the processing area and retained therein against vertical movement by the clamping means of this invention.

The clamping means includes a stop-defining means affixed to the workpiece or the workpiece carrier and a detent element depressable into engagement with the stop-defining means. In the clamping means shown in the drawing, the detent element is operable to hold the workpiece carrier down against the flat support while in engagement with the stop-defining means and the latter extends alongside the guide means for laterally guiding the carriers. The stop-defining means is a rack having a succession of teeth constituting the stops along the conveying path and the detent element is arranged for engagement with the successive teeth. In this manner, one unidirectional operating motion clamps the workpiece carrier against the flat guide support therefor and accurately locates the carrier in the processing area.

Figure 3:
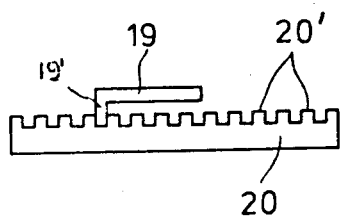
FIG. 3 is a side elevational view showing the clamping means of FIG. 2.

In the clamping means of FIGS. 2 and 3, the detent element comprises clamping member 19 vertically movably mounted on each guide ledge 23 (only one clamping member being shown for sake of clarity of illustration), each clamping member carrying latch 19' for engaging a selected one of teeth 20' of rack 20 mounted on a respective guide rib 25. The control of stop pins 29 and/or of clamping members 19 is effected from a central control or a control at the work station. Thus, when work is to be done on a workpiece carried on pallet 24, stop pins 29 are raised and clamping members 19 are lowered for accurately locating and securely retaining the pallet in the processing area against movement in any direction. When the stop pins are lowered and the clamping membera are raised, carrier 24 in the processing area may be pushed out of it by successive pallet 24 until it is contacted by a forward pair of friction rollers 27 to be driven on. If desired, rack 20 may be replaceably mounted on guide ribs 25 so that racks with different tooth spacings may be used, if desired. Also, depending on the moment of downward movement of clamping members 19, latch 19' will engage different rack teeth 20' so that the specific position of pallet 24 in the processing area may be selected. The spacing of the rack teeth determines the minimal steps of movement of the pallet in the processing area.

Figure 4:
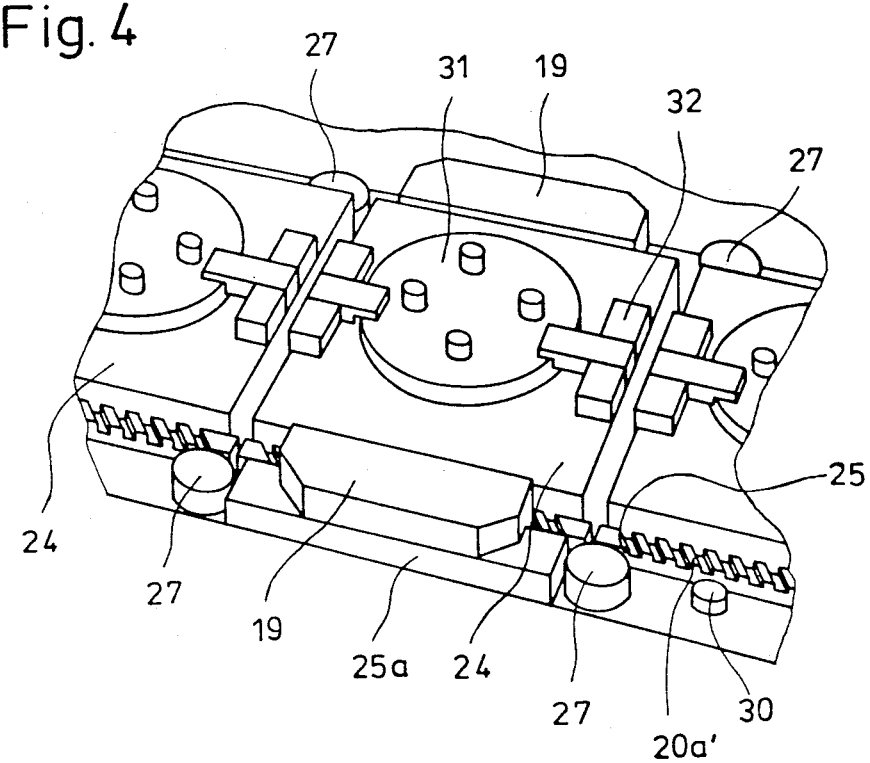
FIG. 4 is a perspective view of one work station and showing another embodiment of the clamping means.

In the embodiment of FIG. 4, a pallet 24 is shown in full in a processing area of the work station while adjacent pallets are partially shown in the conveying path. The lateral guide means for the successive pallets is constituted by a succession of freely rotatable rollers 30 mounted in the conveyor section alongside guide ribs 25 on the pallets. The pallets are vertically guided on the flat support of the table and are laterally guided between rollers 30. They are driven by friction rollers 27. At each processing area, a pair of ledges 25a, 25a in alignment with rollers 30 engages the sides of guide ribs 25 and mounts clamping members 19 for vertical movement. In this embodiment, rack teeth 20a' extend obliquely to the conveying path, the illustrated angle of the rack teeth with respect to the conveying path being 45°. Clamping members 19 comprise a rack having a succession of teeth complementary to teeth 20a' so that the rack teeth will mesh when clamping members 19 are lowered.

In either embodiment of the clamping means, workpiece carrier 24 will be accurately located in the processing area and will be securely held against movement in any direction by a single unidirectional operating motion of one of the clamping means components.

FIG. 4 also illustrates workpiece 31 held on pallet 24 by a pair of suitable clamps 32, 32 and, as highly diagrammatically shown in FIG. 2, working tool 13 is mounted in the processing area for working on the workpiece. Means 14, 15 for adjustably positioning the working tool in transverse and longitudinal relation to the conveying path indicated by arrow 18 is connected to the working tool. The positioning means comprises drives 14 for adjustably positioning the working tool in longitudinal relation to the conveying path, as indicated by double-headed arrow 16, and drives 15 for adjustably positioning working tool 13 in transverse relation to the conveying path, as indicated by double-headed arrow 17. This adjustability of the working tool in both directions and the retention of pallet 24 in a selected position in the processing area make it possible for the working tool to reach practically every point of pallet 24 and, thus, every desired point of the workpiece on it. The positioning of the working tool may be suitably programmed for a succession of working steps. For the sake of clarity, tool positioning drives 14 and 15 have been illustrated laterally offset from the working tool but they may be mounted directly above the tool in the processing area. Preferably, the positioning drives are steplessly variable stepping drives for selecting adjustable positions of the working tool, pneumatically or hydraulically operated cylinder-and-piston drives being illustrated. However, particularly for reciprocating working tool 13 longitudinally in the direction of arrow 16, a stepping drive may be used, the steps of the drive preferably differing from the spacing of rack teeth 20' so that intermediate points may be adjusted between the points determined by teeth 20'.

Working tool 13 may be any type of tool used in an assembly-line manufacture, including electronic components and articles, such as printed circuits, integrated circuits, amplifiers, transistors, resistors and condensers. In such case, electronic modules may be emplaced at the work station on a plate by means of suction or gripping tools, the modules being supplied to the tools through a delivery conduit, such as a flexible hose through which they are fed in alignment, or the tool may be moved to a storage station, pick up a module and move back to the work station for emplacement of the module. In this case, a suitably shaped printed plate may be moved through the work station to receive the modules for assembly therewith, rather than a pallet carrying a workpiece or workpieces. For instance, all like integrated circuits may be put in place at one work station, all the amplifiers, condensers and the like in succeeding work stations, the wires may be emplaced in the following work station, and a final soldering station may be used, where the underside of the assembled plate is free to permit soldering of all the electrical connections may be effected in a single operation. During the assembly, the articles are protected from dust or other dirt.

Using a single head 13 for the working tools has the advantage of being able to work on closely adjacent points which could not, or only with difficulty, be reached by twin heads or tools.

While the adjustment of working tool head 13 has been described along two directions 16 and 17 perpendicular to each other, arcuate or other adjustment paths may also be used, or the adjustment movements may be triggered in response to templates. If the work is concentrated along one of the lateral edges of the workpiece or workpiece carrier, the work on the right may be carried out during one pass of the workpiece through the work station and the work on the left may be effected during a return pass. In this case, the drive means is arranged to operate in both directions and is programmed to move the workpiece more than once through the same work station.

What is claimed is:

1. In an assembly line arrangement defining a linear conveying path for successive workpiece carriers for a workpiece, which comprises a succession of work stations, each work station having a conveyor section and the conveyor sections of successive ones of the work stations being arranged in series to constitute the linear conveying path, the conveyor section of each work station having a succession of areas each of which accommodates a respective one of the workpiece carriers and at least one of the successive areas being a waiting area and at least one other one of the areas being a processing area for working on the workpiece, and each conveyor section including guide means for vertically and laterally supporting and guiding the successive workpiece carriers along the conveying path and drive means spaced along and separate from the guide means, the drive means being operable for driving each workpiece carrier only through the waiting area of the conveyor section, and means for stopping and securely clamping a respective one of the workpiece carriers in a respective one of the processing areas, the improvement of the stopping means being independent of the clamping means and including a stop operable between a rest position permitting the workpiece carrier to be driven from the one processing area to a successive one of the areas and an arresting position wherein the stop retains the workpiece carrier in the one processing area, the clamping means including a selective stop-defining means affixed to the workpiece carrier and a detent element depressable into engagement with the stop-defining means for accurately locating the workpiece carrier retained in the processing area by the stop in the arresting position thereof.

2. In the assembly line arrangement of claim 1, the successive work stations being replaceable and the drive means having discrete driving devices for individually driving each workpiece carrier independently.

3. In the assembly line arrangement of claim 1 or 2, the guide means for vertically guiding the successive workpiece carriers comprising a support therefor in the processing area and the detent element of the clamping means being operable to hold the workpiece or workpiece carrier down against the support while in engagement with the stop-defining means.

4. In the assembly line arrangement of claim 3, the stop-defining means being affixed to the workpiece carriers for extending alongside the guide means for laterally guiding the workpiece carriers, the stop-defining means defining a succession of stops along the conveying path and the detent element being arranged for engagement with the successive stops for accurately locating the workpiece carriers in the processing area.

5. In the assembly line arrangement of claim 4, the stop-defining means being a rack having a succession of teeth constituting said stops.

6. In the assembly line arrangement of claim 5, the detent element comprising a latch for engaging a selected one of the rack teeth.

7. In the assembly line arrangement of claim 5, the detent element comprising a rack having a succession of teeth complementary to the teeth of the stop-defining means rack.

8. In the assembly line arrangement of claim 7, the rack teeth extending obliquely to the conveying path.

9. In the assembly line arrangement of claim 3, a working tool for working on the workpiece and means for adjustably positioning the working tool in transverse relation to the conveying path.

10. In the assembly line arrangement of claim 9, means for adjustably positioning the working tool in longitudinal relation to the conveying path.

11. In the assembly line arrangement of claim 3 or 10, the stop-defining means being replaceably affixed to the workpiece carrier.

12. In the assembly line arrangement of claim 10, the means for longitudinally positioning the working tool being a stepping drive.

13. In the assembly line arrangement of claim 9 or 12, the means for adjustably positioning the working tool being a steplessly variable stepping drive for selecting the adjustable positions of the working tool.

14. In the assembly line arrangement of claim 1 or 2, the guide means for vertically supporting and guiding the successive workpiece carriers comprising a continuous support surface therefor and the stop is a vertically movably pin retractable into the rest position below the support surface and raised above the support surface in the arresting position, the pin being mounted in the support surface adjacent and downstream of the one processing area.

* * * * *